F. P. RENNEBURG.
SCREW PRESS.
APPLICATION FILED SEPT. 9, 1911.
1,076,995.
Patented Oct. 28, 1913.
3 SHEETS—SHEET 2.
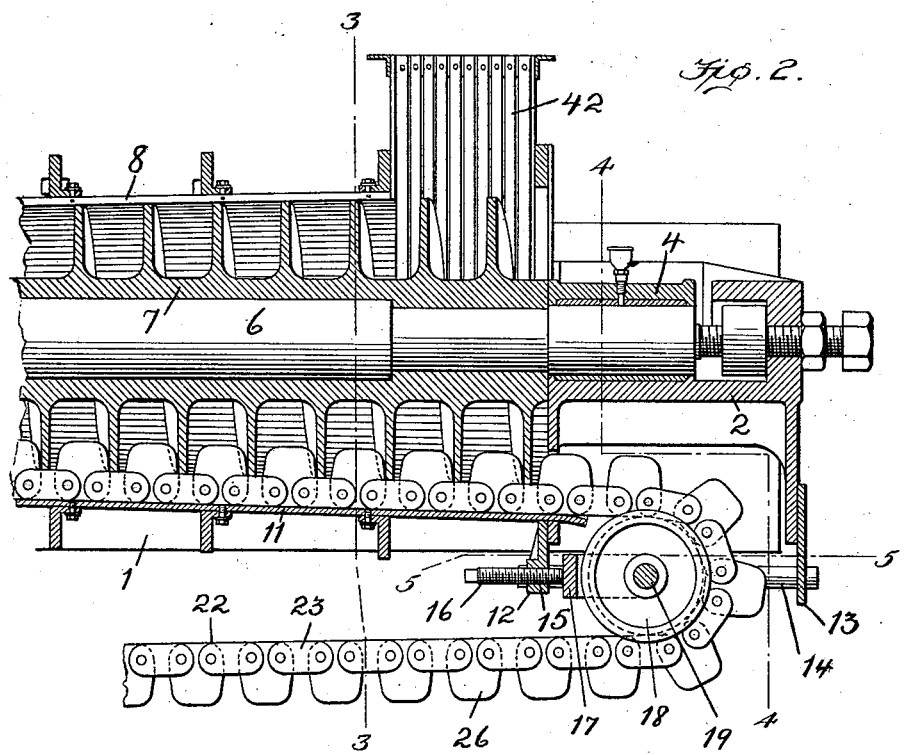
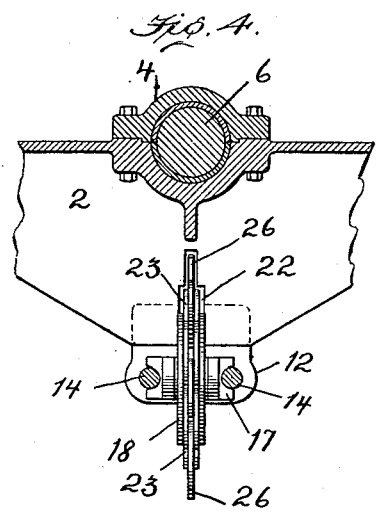
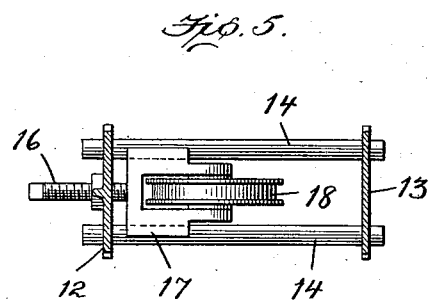
Witnesses
Edwin L. Bradford
G. Ferd. Vogt
Inventor
Frederick P. Renneburg
By
Mann & Co.
Attorneys F. P. RENNEBURG.
SCREW PRESS.
APPLICATION FILED SEPT. 9, 1911.
1,076,995.
Patented Oct. 28, 1913.
3 SHEETS—SHEET 3.
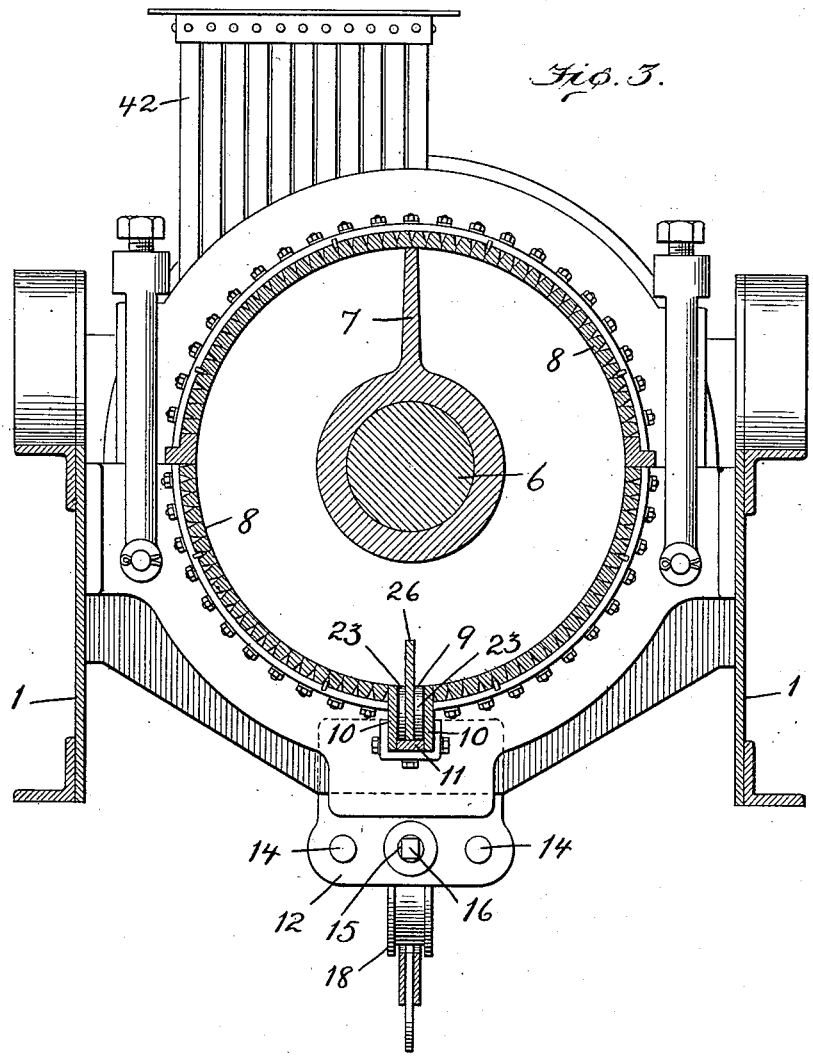
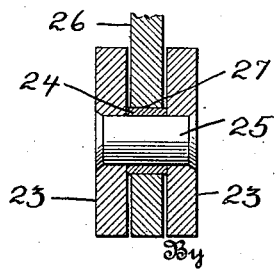
Witnesses
Edwin L. Bradford
G. Ferd. Vogt.
Inventor
Frederick P. Renneburg
By Mann & Co.
Attorneys

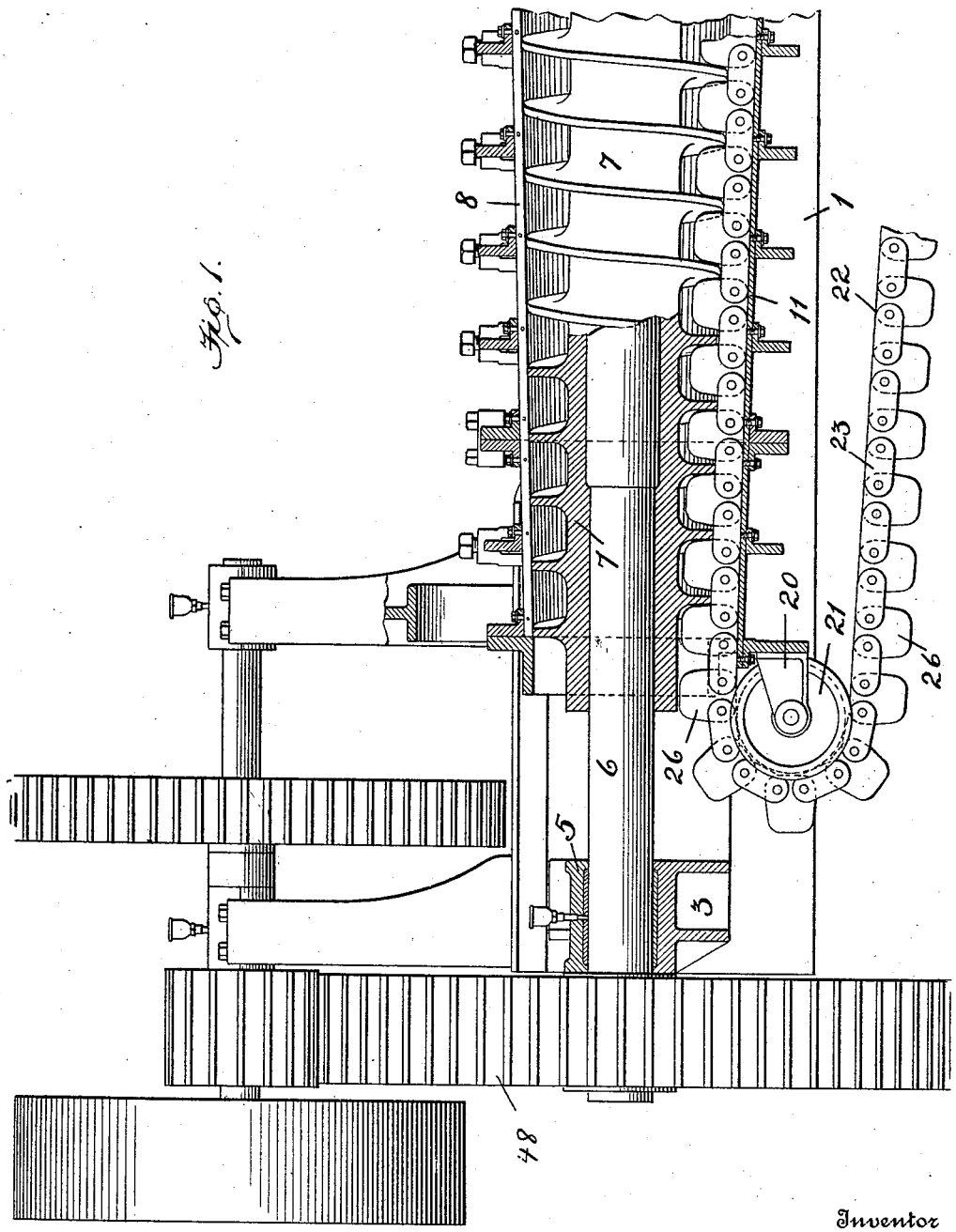

UNITED STATES PATENT OFFICE.

FREDERICK P. RENNEBURG, OF BALTIMORE, MARYLAND.

SCREW-PRESS.

1,076,995.   Specification of Letters Patent.   Patented Oct. 28, 1913.

Application filed September 9, 1911. Serial No. 648,493.

*To all whom it may concern:*

Be it known that I, FREDERICK P. RENNEBURG, a citizen of the United States, residing at Baltimore, in the State of Maryland, have invented certain new and useful Improvements in Screw-Presses, of which the following is a specification.

This invention relates to improvements in presses for extracting oil and water from fish and to that class of presses where the material is conveyed by a tapered screw through a correspondingly tapered shell thus compressing and squeezing the oil and water therefrom.

The present invention has particular reference to an improved means for preventing the rotation of the fish material in the tapered shell and with the screw during the pressing operation and thus prevent the clogging or choking up of the tapered shell.

It has been found in practice that during the pressing operation in tapered shell screw presses the material while being pressed frequently becomes so packed between the tapered shell and the threads of the screw that it simply turns with the screw instead of advancing through the tapered shell and when this condition arises it becomes necessary to open the shell and dig out the packed material. This operation is a laborious and expensive one because of the great size and enormous weight of the tapered shell and requires the aid of cranes consuming much time and causing serious delays. Then too, the clogging may and sometimes does take place a second time very shortly after the machine has once been cleared.

The present invention therefore has for its object to prevent the clogging by providing improved means to prevent the material from turning with the screw in the tapered shell, thus requiring said material to positively advance as the screw turns.

The invention is illustrated in connection with a machine or press which forms the subject of U. S. Patent 1,005,472 granted to me October 10, 1911 and as said machine is fully illustrated and described in said patent it is deemed unnecessary to enter into the details thereof in the present case.

The accompanying drawings illustrate the invention in which, Figure 1, is a sectional elevation through the discharge end of the machine,—the section being a vertical longitudinal one. Fig. 2, is a similar view of the feed-end of the machine. Fig. 3, shows a vertical cross-section of the same,—the section being taken on the line 3—3 of Fig. 2. Fig. 4, is a sectional detail on the line 4—4 of Fig. 2 and shows an end view of the movable abutment that travels through the shell to prevent rotation of the material. Fig. 5 is a sectional plan view of the guide bars which contain the pulley about which the movable abutment travels, the section being taken on the line 5—5 of Fig. 2, and Fig. 6, is a sectional detail through the links and plate that form the abutment.

Referring to the drawings, the numeral, 1, designates two parallel side walls of the machine formed of structural steel which are connected at one end by a bearing plate, 2, and at the other end by means of a bracket plate, 3,—said walls, bearing and bracket plates together forming a rectangular structure of considerable strength and rigidity to meet the strains that are put upon them. The bearing plate, 2, at one end of the side walls and the bracket plate, 3, at the other end are respectively provided with bearings, 4, and, 5, which sustain a long horizontal shaft, 6, that carries a tapered spiral conveyer, 7. The spiral conveyer is inclosed within a tapered slotted shell, 8, comprising upper and lower semi-cylindric sections which are rigidly clamped together as fully described in my said patent but which may be of other suitable constructions that will allow the oil and water to run off as it is pressed from the material.

The shaft and screw conveyer, 7, are revolved by means of a gear, 48, which is one of a train of gears at one end of the machine but obviously other driving means may be employed to revolve the screw.

By reference to the drawings it will be seen that the shell and screw are tapered in the same direction,—the larger end being at the feed hopper, 42, and the smaller end at the point of discharge. It is because of this taper that the material under compression becomes tightly wedged between the tapered shell and the threads and often merely turns with the threads instead of advancing through the shell. To overcome this I have provided the shell with a central longitudinal channel way, 9, at its lower side, as clearly shown in Fig. 3. This channelway has two spaced-apart side plates, 10, and a bottom plate, 11, all of which extend throughout the length of the shell and said channelway is open at both ends. The entire length of this channelway, 9, is open to the interior of the shell, but said channelway is closed to the exterior thereof.

At the feed end of the machine I provide suitable depending hanger plates, 12, and, 13, respectively, which support spaced-apart parallel guide bars, 14. The plate, 12, has a central threaded opening, 15, midway between the guide bars, 14, and a threaded stem, 16, extends through said opening and has its end engaged with a guide block, 17, that rests upon or is supported by the bars, 14. The connection between the stem, 16, and block, 17, is such that by turning the stem the block may be moved horizontally on the bars and its position thereon varied for a purpose presently to be described. A grooved pulley, 18, is carried by the block, 17, so it may revolve freely in a vertical plane and in line with the channelway, 9,—a short shaft, 19, being provided on which the pulley is sustained. At the discharge end of the shell I provide a hanger bracket, 20, which carries a pulley, 21, which latter also has position in line with the channelway, 9, of the shell. It is therefore to be understood that pulley, 18, has position at the feed end of the shell and pulley, 21, at the discharge end of the shell and both pulleys are in line with the channelway, 9.

An endless chain, 22, has its upper stretch extending through the channelway, 9, at the lower side of the shell, 8, and said chain passes around the pulley, 21, at the discharge-end of the machine then returns beneath the shell and passes up and over pulley, 18, which guides it into the channelway again at the feed-end of the machine. The endless chain is formed in the present instance of numerous links, 23, which are held in a separated condition by means of interposed bushings, 24, through which a pintle or rivet 25, extends. The rear end of one pair of links and the forward end of the next pair of links are connected by means of a plate, 26, which latter has perforations, 27, through which the bushings, 24, project as clearly shown in Fig. 6 of the drawing.

By reference to Fig. 3, it will be seen that the links travel in the channelway, 9, and that the upper portion of the plate, 26, projects from the channel and into the shell. It will further be noted by referring to Fig. 1 that the plates, 26, are spaced from each other and that the edges thereof which enter the shell project between the threads of the screw conveyer and are engaged by said threads.

It is obvious that when the screw is revolved in the shell the thread thereof will engage the rear edges of the plates, 26, and thus move the latter and the links forward through the channelway thus causing the endless chain to travel continuously and successively feed the plates, 26, between the threads of the screw conveyer.

From the foregoing explanation it will be understood that the endless series of plates are caused to move longitudinally through the shell while projecting therein and between the threads and by thus projecting, the plates form a longitudinal abutment through the shell and from one end of the screw to the other and by projecting into the material under treatment will prevent rotation of the latter as the screw conveyer is revolved. As the material will be prevented from rotation with the screw it cannot clog and halt but will be fed continuously forward and gradually compressed to expel the water and oil until discharged at the small end of the shell.

Having thus described my invention what I claim and desire to secure by Letters Patent is,—

In a screw press the combination of a cylindric shell having at its bottom a longitudinal slot; a longitudinal channelway having a bottom and two vertical sides and attached to the shell and closing the said slot said channelway having its top open to the interior of the shell; a press-screw extending through said cylindric shell; and a series of plates projecting vertically and connected together as an endless chain and forming two stretches of such plates of which one stretch extends longitudinally of the shell and said press-screw with the plates projecting upwardly between the threads of the screw, and said stretch of the chain being supported by and sliding through the channelway.

In testimony whereof I affix my signature in presence of two witnesses.

FREDERICK P. RENNEBURG.

Witnesses:
 Louis C. Klerleim,
 G. Ferd. Vogt.

---

Copies of this patent may be obtained for five cents each, by addressing the "Commissioner of Patents, Washington, D. C."